(12) United States Patent  
Chapman et al.

(10) Patent No.: US 10,989,845 B2
(45) Date of Patent: *Apr. 27, 2021

(54) METHOD OF MAKING AN ARRAY OF ABERRATED OPTICAL ELEMENTS

(75) Inventors: Steven R. Chapman, Glenview, IL (US); Kejian (Kevin) Huang, Buffalo Grove, IL (US); Feng Wu, Lake Zurich, IL (US)

(73) Assignee: Avery Dennison Corporation, Glendale, CA (US)

( * ) Notice: Subject to any disclaimer, the term of this patent is extended or adjusted under 35 U.S.C. 154(b) by 674 days.

This patent is subject to a terminal disclaimer.

(21) Appl. No.: 11/773,513

(22) Filed: Jul. 5, 2007

(65) Prior Publication Data
US 2008/0012162 A1  Jan. 17, 2008

Related U.S. Application Data

(60) Provisional application No. 60/807,520, filed on Jul. 17, 2006, provisional application No. 60/829,395, filed on Oct. 13, 2006.

(51) Int. Cl.
*G02B 5/124* (2006.01)
*B29D 11/00* (2006.01)

(52) U.S. Cl.
CPC ........ *G02B 5/124* (2013.01); *B29D 11/00605* (2013.01)

(58) Field of Classification Search
CPC .............................. G02B 5/124; B29D 11/605
USPC ........ 264/1.1, 1.31, 1.9, 1.34, 2.5, 219, 220, 264/225, 226; 65/37; 359/529, 530, 900
See application file for complete search history.

(56) References Cited

U.S. PATENT DOCUMENTS

| 3,684,348 | A | | 8/1972 | Rowland |
| 3,712,706 | A | | 1/1973 | Stamm |
| 3,833,285 | A | | 9/1974 | Heenan |
| 4,478,769 | A | | 10/1984 | Pricone et al. |
| 4,775,219 | A | | 10/1988 | Appeldorn et al. |
| 4,938,563 | A | | 7/1990 | Nelson et al. |
| 5,156,863 | A | * | 10/1992 | Pricone et al. ............... 425/363 |
| 5,450,235 | A | | 9/1995 | Smith et al. |
| 5,770,124 | A | * | 6/1998 | Marecki et al. ............ 264/1.36 |

(Continued)

FOREIGN PATENT DOCUMENTS

| BR | 0317265 | 11/2005 |
| CN | 1723400 | 1/2006 |

(Continued)

OTHER PUBLICATIONS

"Study of Light Deviation Errors in Triple Mirrors and Tetrahedral Prisms," J. Optical Soc. Amer., vol. 48, No. 7, pp. 496-499, Jul. 1958 by P.R. Yoder, Jr.

(Continued)

*Primary Examiner* — Michael H. Wilson
*Assistant Examiner* — Yana B Krinker (57) ABSTRACT

A method of making an array (18) of aberrated optical elements (20). The method comprises the steps of providing a substrate having a first surface with forming elements thereon, and controlled working a localized region on the first surface of the substrate. The controlled working is of a magnitude sufficient to aberrate one or more of the forming elements in an affected site surrounding the localized region.

17 Claims, 4 Drawing Sheets

(56) References Cited

U.S. PATENT DOCUMENTS

| | | | |
|---|---|---|---|
| 5,926,314 A | 7/1999 | Smith et al. | |
| 6,015,214 A | 1/2000 | Heenan et al. | |
| 6,048,255 A * | 4/2000 | Kuo et al. | 451/41 |
| 6,231,797 B1 | 5/2001 | Bernard et al. | |
| 6,871,966 B2 * | 3/2005 | Couzin et al. | 359/530 |
| 6,884,371 B2 * | 4/2005 | Smith | 264/1.9 |
| 6,984,047 B2 | 1/2006 | Couzin et al. | |
| 2001/0026860 A1 * | 10/2001 | Benson et al. | 428/162 |
| 2001/0048169 A1 * | 12/2001 | Nilsen et al. | 264/2.5 |
| 2003/0223137 A1 * | 12/2003 | Araki et al. | 359/883 |
| 2004/0114243 A1 | 6/2004 | Couzin et al. | |
| 2007/0071932 A1 * | 3/2007 | Huang | 428/40.1 |

FOREIGN PATENT DOCUMENTS

| | | |
|---|---|---|
| JP | 2006-189664 | 7/2006 |
| KR | 10-2006-0006764 | 1/2006 |
| RU | 2005-121911 | 1/2006 |

OTHER PUBLICATIONS

"Standard Practice for Describing Retroreflection", Designation: E 808-01, pp. 1-10.
"Standard Practive for Measuring Photometric Characteristics of Retroreflectors", Designation: E 809-02, pp. 1-11.
PCT/US2007/072824; PCT International Search Report dated Nov. 26, 2007.
International Preliminary Report on Patentability dated Oct. 28, 2008 issued in corresponding International Application No. PCT/US2007/072824 filed Jul. 5, 2007.

\* cited by examiner

METHOD OF MAKING AN ARRAY OF ABERRATED OPTICAL ELEMENTS

RELATED APPLICATION

This application claims priority under 35 U.S.C. § 119 (e) to U.S. Provisional Patent Application No. 60/807,520 filed on Jul. 17, 2006 and to U.S. Provisional Patent Application No. 60/829,395 filed on Oct. 13, 2006. The entire disclosures of these provisional patent applications are hereby incorporated by reference.

FIELD OF THE INVENTION

This invention relates generally to a method of making an array of aberrated optical elements.

BACKGROUND OF THE INVENTION

Retroreflective sheeting is used to reflect light from a source point back to an observation point. For example, in a highway safety application (e.g., a highway sign, a pavement marker), light from a vehicle headlight is reflected back to the eyes of the driver of the vehicle. When the light is reflected back to the observation point, the divergence angle α can range from 0° to more than 3° at any given rotational angle ε.

The value of the divergence angle α and the rotational angle ε in any given situation depends on the geometry of the source (e.g., the headlight) and the observer (e.g., the driver), and the distance from source/observer (e.g., the vehicle) to the retroreflective sheeting. For example, the divergence angle α for a large truck's right headlight and its driver at a distance of about 40 meters from a road sign will be approximately 3°, while the divergence angle α for an automobile's left headlight and its driver at a distance of about 600 meters from a road sign will be approximately 0.05°. The value of the rotational angle ε will be different for left and right headlights of a vehicle, and will also depend on the vehicle and driver geometry and the position of the road sign.

Ideally, retroreflective sheeting used in road signs will produce a pattern of retroreflected light having sufficient intensity over an adequate range of divergence angles α and a wide range of rotation angles ε. For example, even a non-urban retroreflective highway sign should retroreflect light through a divergence angle α of about 1° which corresponds to the value of the divergence angle α from a large truck's right headlight back to its driver at a distance of about 120 meters from the road sign. Also, if the sheeting is in random orientation on a road sign, retroreflectance is required at every value of the rotational angle ε.

To increase the mean geometric divergence of a retroreflective material, it is known to introduce intentional aberrations into the retroreflective elements. For example, with microcubes, aberrations can be introduced which result in dihedral angles deviating slightly from 90°. Historically, these aberrations have stemmed from geometries introduced into the master substrate during tooling. (See e.g., U.S. Pat. Nos. 3,712,706, 4,775,219, 4,938,563, 6,015,214, US2003/007815A1, etc.). U.S. Pat. No. 6,871,966 discloses a method of introducing aberration-producing geometries by controlled working of the master substrate after tooling or by controlled working of copy substrates made from the master substrate. (This patent is assigned to the assignee of the present invention and its entire disclosure is hereby incorporated by reference.) Specifically, the substrate is worked at localized regions on its non-element-carrying surface (i.e., the surface opposite the surface on which the forming elements are carried) at a magnitude sufficient to change the geometry of the optical elements on the opposite element-carrying surface.

SUMMARY OF THE INVENTION

The present invention provides a method of producing an array of aberrated retroreflective elements wherein the element-carrying surface of a substrate is controlled worked. These and other features of the invention are fully described and particularly pointed out in the claims. The following description and drawings set forth in detail certain illustrative embodiments of the invention which are indicative of but a few of the various ways in which the principles of the invention may be employed.

DETAILED DESCRIPTION

Figure 1:
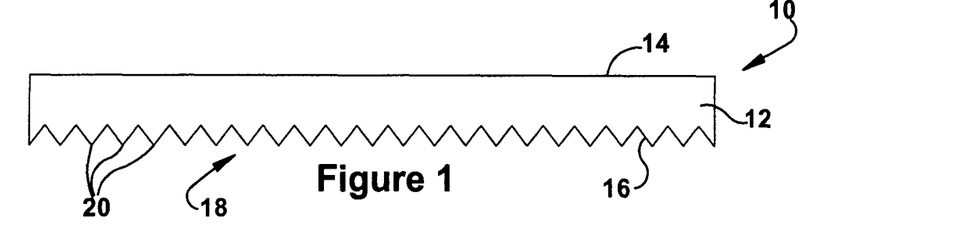
FIG. 1 is a side view of retroreflective sheeting having an array of aberrated retroreflective elements according to the present invention.
Figure 2:
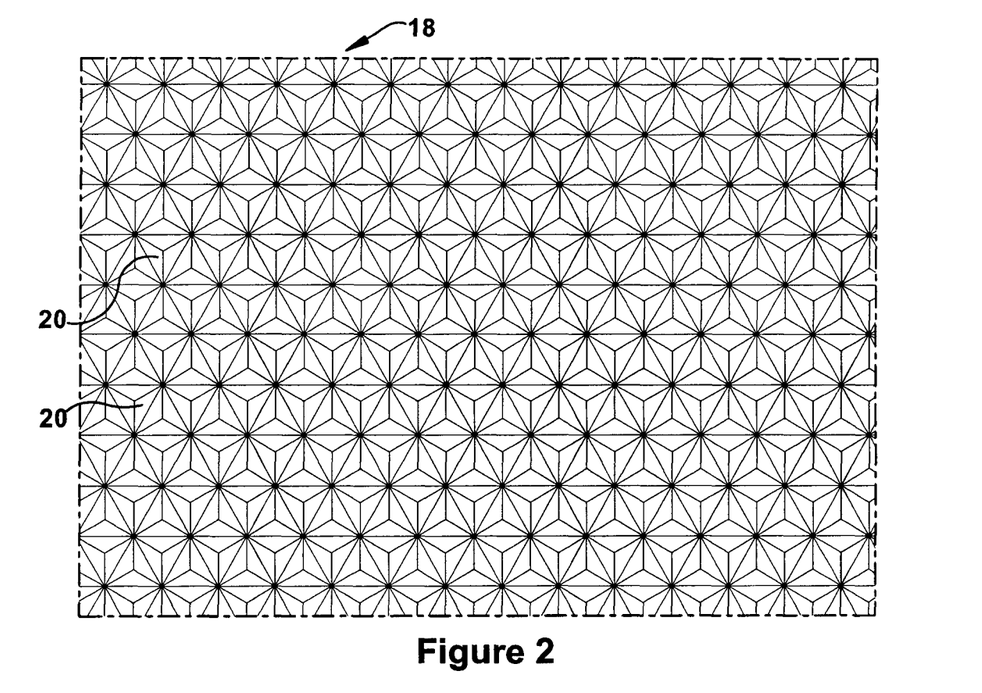
FIG. 2 is a surface view of the array of aberrated retroreflective elements.
Figure 3:
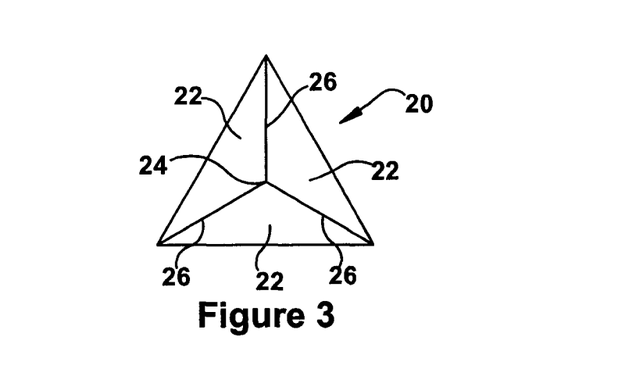
FIG. 3 is a close-up view of a retroreflective element.

Referring now to the drawings, and initially to FIGS. 1 and 2, retroreflective sheeting 10 according to the present invention is shown. The retroreflective sheeting 10 comprises a clear resin (e.g., acrylic, polycarbonate, vinyl, etc.) sheet material 12 having a front surface 14 and a rear surface 16 on which an array 18 of aberrated retroreflective elements 20 are formed. The illustrated retroreflective elements 20 are cube corner elements and, more particularly, microcubes. As is best seen by referring additionally to FIG. 3, each retroreflective element 20 comprises three mutually perpendicular faces 22 that meet an apex 24 and that intersect with each other at edges 26 forming three dihedral angles. However, other retroreflective elements are possible with, and contemplated by, the present invention. Moreover, the elements 20 need not be retroreflective, as they can be any type of optical elements (including micro-optical elements) wherein aberrations are intentionally introduced for the purpose of improving an optical property.

Figure 4:
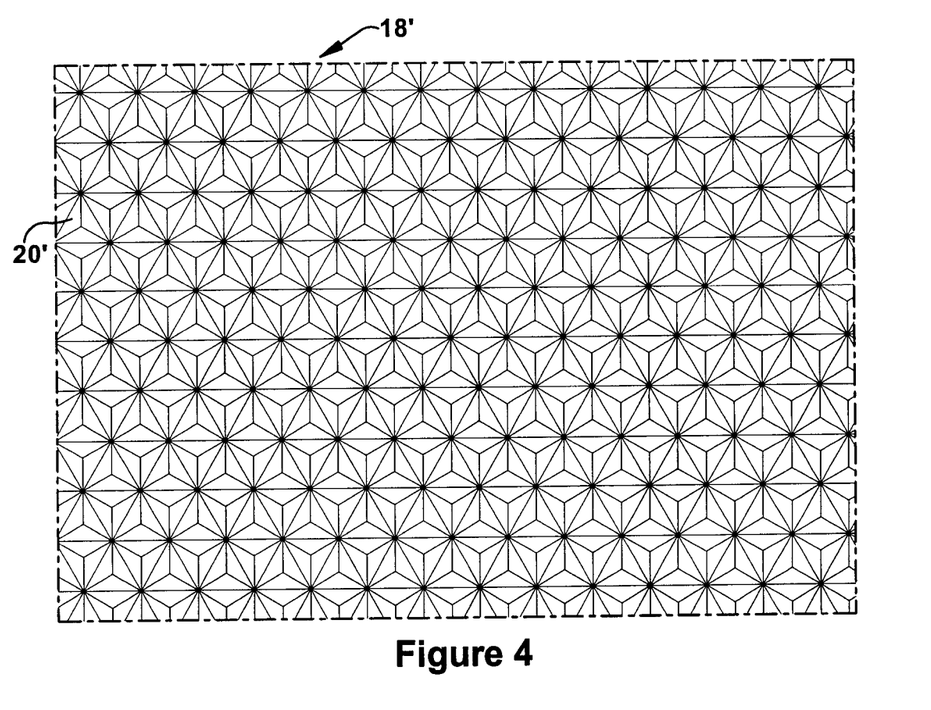
FIG. 4 is a surface view of an array of non-aberrated retroreflective elements.

When discussing the optical properties of the array 18 and/or the retroreflective elements 20, it is helpful to use an analogous array 18' as a basis for comparison. The analogous array 18', shown in FIG. 4, has the same array pattern as that of the array 18 and has retroreflective elements 20' that are all identical to the retroreflective elements 20 prior to aberration. For example, in the illustrated cube corner embodiment, the retroreflective elements 20' of the analogous array 18' could each include three dihedral angles that are each exactly (or almost exactly) 90°. The analogous non-aberrated array 18' would possess certain overall optical qualities including a mean geometric divergence and a total retroreflectance.

According to the present invention, the aberrations in the retroreflective elements 20 are of a sufficient magnitude to cause the array 18 to have a greater mean geometric divergence (e.g., at least 0.2°, at least 0.5°, at least 1°, and/or at least 0.1°) than the non-aberrated array 18' (e.g., 0° to 0.5°). Additionally or alternatively, the array 18 can have at least 90%, at least 94% and/or at least 98% preservation of total retroreflectance when compared to the non-aberrated array 18'. The aberrations in the retroreflective elements 20 are preferably such that face smoothness and/or edge sharpness is substantially the same as the non-aberrated elements 20'.

Figure 5:
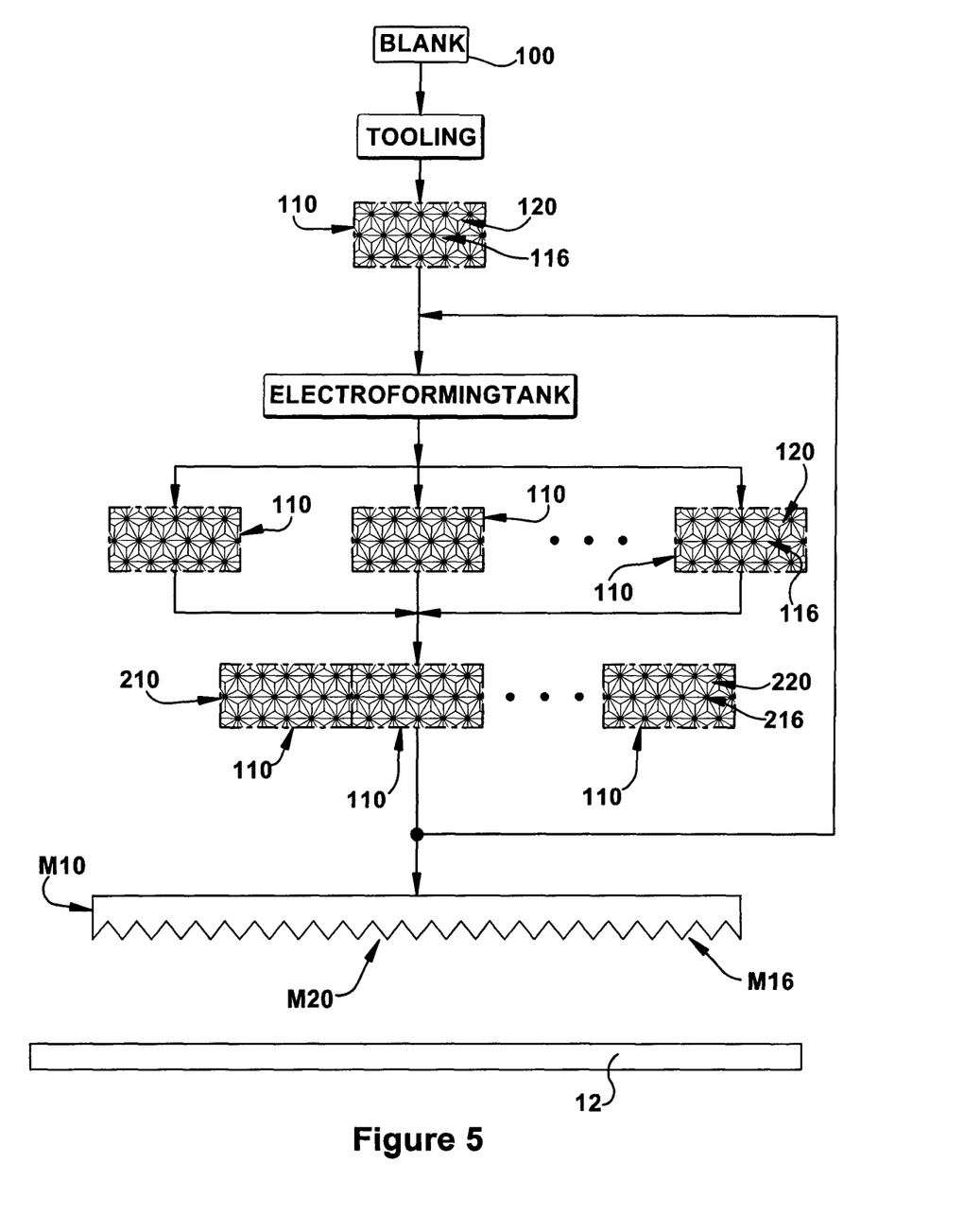
FIG. 5 is a schematic diagram of a method of making retroreflective sheeting.

Referring now to FIG. 5, a method of making the retroreflective sheeting 10 is schematically shown. In this method, a blank substrate 100 is tooled to produce a master substrate 110 having a surface 116 carrying forming elements 120. The forming elements 120 can be of the same gender or the opposite gender as the retroreflective elements 20 and, in either event, have a geometry corresponding to the desired geometry of the non-aberrated elements 20'. In the illustrated embodiment, the master substrate 110 includes male elements 120.

The master substrate 110 is then used to generate (e.g., by electroforming) one or more original copy substrates 110. The copy substrates 110 each have a surface 116 carrying forming elements 120, which are opposite in gender as the forming elements 120 of the master substrate 110. The one or more original copy substrates 110 can be assembled into an assembling substrate 210. The assembling substrate 210 can be used to generate (e.g., by electroforming) next order copy substrates 110, which each have a surface 116 carrying forming elements 120, which are opposite in gender as the forming elements 220 of the assembled substrate 210. The second order copy substrates 110 can be assembled together into a second order assembling substrate 210. The second order assembling substrate can be used to generate (e.g, by electroforming) the third order substrates 110 and the copy sequence could be continued in a similar manner until the production copy substrates M10 are produced. The production tool M10 will have an arrayed surface M16 carrying forming elements M20, which are of the opposite gender as the retroreflective elements 20. The production tool M10 can then used to form (e.g., by embossing, casting, compression molding, etc.) the retroreflective elements 20 on the surface 16 of the plastic sheet material 12 to produce the retroreflective sheeting 10.

Figure 6:
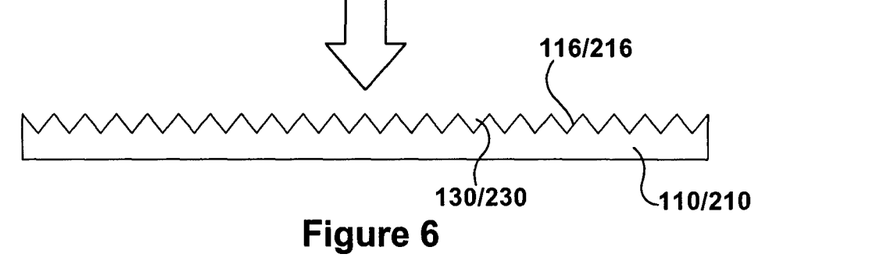
FIG. 6 is a schematic view of controlled working being performed on a substrate.

As is shown schematically in FIG. 6, controlled working is performed on at least one localized region 130/230 on the first surface 116/216 of the master substrate 110, a copy substrate 110, and/or an assembly substrate 210. The controlled working step can be performed at one or more stages of the copying/clustering steps. Prior to the controlled working step, the geometry of the forming elements 120/220 on the substrate 110/210 would correspond to the non-aberrated elements 20' in the analogous array 18'. After the controlled working step, the forming elements 120/220 on the worked substrate 110/210, and the forming elements 120/220 on substrates 110/210 copied from the worked substrate, would correspond to the aberrated retroreflective elements 20 in the array 18.

The controlled working can be performed on the master substrate 110, the copy substrates 110, or the assembling substrates 210.

The substrates 110/210 can be made from a metal or a plastic. In the illustrated embodiment, for example, the substrates 110/210 can be made from electroformed nickel. Because the element-carrying surface 116/216 is worked (as opposed to the opposite surface), the present invention can accommodate a variety of substrate thicknesses, even those greater than about 10.00 mm. That being said, the substrate 110/210 can have a thickness in the range of about 0.01 mm to about 2.0 mm and/or in the range of about 2.0 to about 10.0 mm. The master substrate 110 can be thicker than the other substrates (i.e., greater than about 10.0 mm).

Figure 7:
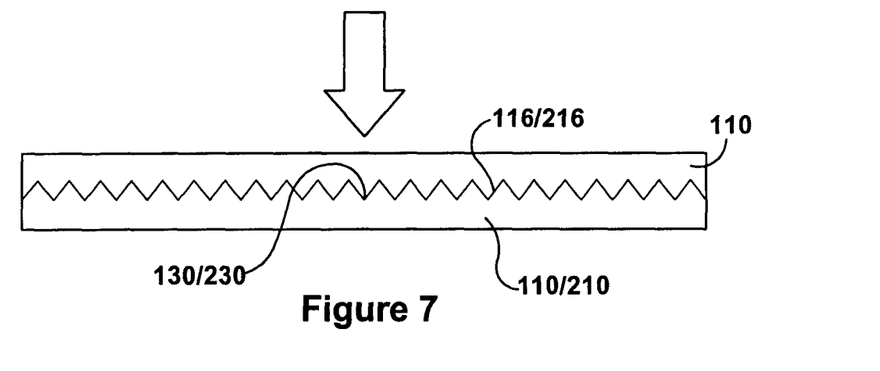
FIG. 7 is a schematic view of controlled working being performed on a substrate while an electroformed copy is attached thereto.

The working of the substrate surface 116/216 is intended to either add, remove, or modify material in the localized regions on this surface, or to simply apply local pressure, temperature, or other disturbance. The working can be of a degree sufficient to cause a change in the stress of the material resulting in, for example, a minute change of one or more dihedral angles. Preferably, the working on the arrayed surface 116/216 is of a magnitude sufficiently small that it will not damage the smoothness of faces and/or the sharpness of edges of the forming elements 120/220 and/or elements 120/220 adjacent thereto. As shown in FIG. 7, the working on the surface 116/216 of a substrate 110/210 can be performed while an electroformed copy 110/210 is still attached thereto.

The working of the arrayed surface 116/216 can be accomplished by a variety of means, including the application of energy, chemicals, or pressure to the second surface. Energy can be applied, for example, as either electrical energy or focused heat, such as by an infra-red laser. Pressure can produce localized distension involving the movement of material which preserves material mass while creating stress. Particle impingement (e.g., very light sandblasting) can also be employed.

Figure 8:
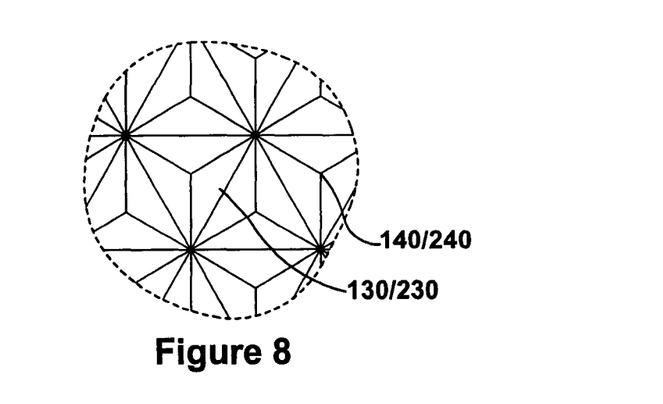
FIG. 8 is a schematic view of showing a localized area of controlled working and a surrounding affected site.

As is shown schematically in FIG. 8, when a controlled working is performed on a localized region 130/230 on the first surface of the substrate 110/210, the aberrations effects not only the forming element(s) 120/220 in this region, but also those in an affected site 140/240 including and surrounding the localized region 130/230. The change in the forming elements 120/220 in the site 140/240 will usually not be uniform and will change depending upon, for example, the distance from the localized region 130/230. For example, in the illustrated cube corner example, the forming elements 120/220 close to the localized region 130/230 could have a greater change in their dihedral angles than the forming elements 120/220 remote from the localized region 130/230.

As was indicated above, controlled working is performed on at least one localized region 130/230. Typically, a controlled working step will be performed on several localized regions 130/230 of the substrate 110/210. The location of these regions 130/230 on the substrate surface 116/216 and/or relative to each other may be in predetermined pattern or semi-random (i.e., a distribution that is under statistical control, but not controlled in full detail). Additionally or alternatively, the magnitude of the controlled working can be the same or different in each localized region 130/230.

One may now appreciate that the present invention provides a method of producing an array 18 of aberrated optical elements 20. Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the claims.

GLOSSARY

An optical element is an element having one or more light-interacting faces.

An array is an arrangement of a large number of the optical elements.

A microoptical element is an optical element having dimensions less than or equal to about 1 mm.

A cube corner element is an element comprising mutually intersecting faces (e.g., three faces) having dihedral angles which are each approximately a predetermined value (e.g., 90°).

A microcube is a corner cube element having a total cube area of less than about 1 mm$^2$. The total cube area is the area enclosed by the cube shape defined by the projection of the perimeter of the cube corner element in the direction of the principal refracted ray.

Retroreflection is reflection in which reflected rays are preferentially returned in directions close to opposite the direction of incident rays, this property being maintained over wide variations of the direction of the incident rays. A retroreflector is a surface or device that produces retroreflection.

A retroreflective element is an optical element that produces retroreflection.

A retroreflective material is a material that has a continuous layer of retroreflective elements. Retroreflective sheeting is a retroreflective material preassembled as a thin film.

The illumination axis is the half-line from the retroreflector center through the source point. The source point is the location of the source of illumination. The retroreflector center is the point on or near a retroreflector that is designated to be the location of the device.

The entrance angle β is the angle between the illumination axis and the retroreflector axis. The retroreflector axis is a designated half-line from the retroreflector center in a direction centrally among the intended directions of illumination.

The observation axis is the half-line from the retroreflector center through the observation point. The observation point is the location of the observer.

The divergence angle α is the angle between the illumination axis and the observation axis. This angle is also called the observation angle.

The mean geometric divergence is the average of all divergence angles α for all rays with a given direction of illumination retroreflected by a retroreflector.

The rotational angle ε is the angle in a plane perpendicular to the retroreflector axis from the observation half-plane to the datum axis measured counterclockwise from a view point on the retroreflector axis. The observation half-plane is the half-plane that originates on the line of the illumination axis and contains the observation axis. The datum axis is a designated half-line from the retroreflector center perpendicular to the retroreflector axis. The datum half-plane is the half plane that originates on the line of retroreflector axis and contains the datum axis.

Total retroreflectance is the percentage of light retroreflected by the optical device.

A forming element is an element used to form, or used to form forming elements to form, an optical element whereby the forming element will have faces corresponding to the faces of the to-be-formed optical element.

A substrate is a material having a surface which carries one or more optical elements or one or more forming elements.

A male optical element is an optical element wherein the faces of the element project outward from first surface of the substrate.

A female optical element is an optical element wherein the faces of the element recess into the first surface of the substrate.

A male forming element is a forming element wherein the faces of the element project outward from first surface of the substrate.

A female forming element is an optical element wherein the faces of the element recess into the first surface of the substrate.

The substrate thickness for a substrate carrying male elements is the thickness of material from which the elements project. The substrate thickness for a substrate carrying female elements is the total thickness of the material.

Copying is the reproduction of forming elements from one substrate onto another substrate by, for example, electroforming, casting, molding, embossing, etc.

The master substrate is the substrate in which the forming elements are first formed in a non-copying manner such as, for example, cutting or ruling.

The chain of copying is the series of copies stemming from an original entity (e.g., a master substrate) by producing a copy (or copies) of the original entity, then producing one or more copies from this copy (or these copies) of the original entity, and then producing one or more copies of the copy (or copies) of the copy (or copies) of the original entity, and so on.

The first order copy is a substrate having forming elements directly copied from the master substrate.

The nth order copy is a substrate having forming elements that are copies from the nth link in a chain of copying containing n−1 intermediate copy links between the original entity and the nth order copy. For example, a 3rd order copy is a copy of a 2nd order copy, which was a copy of a 1st order copy, which was a direct copy of the original entity.

The production tool is the tool carrying the forming elements used to form the optical elements.

An aberration refers to a small change in the geometry of an optical element. For cube corner elements, it would refer more specifically to a small change in one or more of the dihedral angles of the element, this change being sufficient to cause a change in the mean geometric divergence of the optical element or an optical element formed therefrom or from copies thereof.

The angular change produced by the aberration will usually be less than 1°. The verb aberrate means to form an aberration.

An aberrated element is an optical element or a forming element having an aberration.

Controlled working is adding, removing, modifying, distorting, deforming, or disturbing in a controlled manner as opposed to, for example, in a random and/or unintentional manner.

A localized area is the very small area on the array at which the controlled working is performed (e.g. where the energy, chemical, or pressure is actually applied).

An affected site is an area on the area including and surrounding the localized area wherein the elements are aberrated as a result of controlled working in the localized area.

The invention claimed is:

1. A method of making a substrate for assembly into a production tool to make an array of aberrated optical elements, said method comprising the steps of:
   providing a substrate having a first surface with forming elements thereon, wherein the geometry of the forming elements corresponds to the geometry of non-aberrated optical elements in an analogous array comprising mutually intersecting faces;
   performing a working step by application of one of pressure, energy, chemicals, and impingement of particles to the first surface at a localized region on the first surface of the substrate such that face smoothness of the first surface is substantially the same as the non-aberrated optical elements, said working step is of a magnitude sufficient to aberrate forming elements in an affected site including and surrounding the localized region on the first surface;
   wherein the optical elements are retroreflective cube corner elements with three mutually perpendicular faces that intersect with each other at edges forming three dihedral angles;
   wherein said working step results in a dihedral angle of one or more of the forming elements being unequal to 90°;
   wherein the dihedral angle is the angle of a corner element between mutually intersecting faces of the forming element;
   wherein a second surface opposite the first surface is not worked;
   wherein said working step is a controlled working step; and
   wherein the substrate is electroformed nickel.

2. A method as set forth in claim 1, wherein said working step is performed so that the array has a greater mean geometric divergence than the analogous array.

3. A method as set forth in claim 1, wherein said working step is performed so that the array has a total retroreflectance that is at least 90% of that of the analogous array.

4. A method as set forth in claim 1, wherein the optical elements are micro-optical elements.

5. A method as set forth in claim 1, wherein the substrate is a master substrate, a copy of another substrate, or an assembly substrate.

6. A method as set forth in claim 1, wherein said working step is performed while an electroformed copy is still attached to the substrate.

7. A method as set forth in claim 1, wherein the magnitude of the working is sufficiently small such that smoothness of the faces of the forming elements is not substantially damaged, and/or such that sharpness of edges of the forming elements is not substantially damaged.

8. A method as set forth in claim 1, wherein the substrate has a thickness in the range of about 0.01 mm to about 2.0 mm.

9. A method as set forth in claim 1, wherein said working step is accomplished by the application of chemicals.

10. A method as set forth in claim 1, wherein said working step comprises working a plurality of localized regions on the first surface of the substrate.

11. A method as set forth in the claim 1, wherein the magnitude of the working step is the same in at least some of the plurality localized regions.

12. A method as set forth in claim 1, wherein the magnitude of the working step varies in at least some of the plurality localized regions.

13. A method comprising the step of assembling a substrate made by the method of claim 1 into the production tool.

14. A method comprising the step of using a production tool made by the method of claim 13 to form the array of retroreflective elements.

15. A method as set forth in claim 1, wherein the work step comprises impingement of particles to the first surface at the localized region.

16. A method of making a substrate for assembly into a production tool to make an array of aberrated optical elements, said method comprising the steps of:
   providing a substrate having a first surface with forming elements thereon, wherein the geometry of the forming elements corresponds to the geometry of non-aberrated optical elements in an analogous array;
   performing a working step by application of one of pressure, energy, chemicals, and the impingement of particles at a localized region on the first surface of the substrate such that sharpness of edges of the forming elements is not damaged, said working step is of a magnitude sufficient to aberrate forming elements in an affected site including and surrounding the localized region on the first surface;
   wherein the optical elements are retroreflective cube corner elements with three mutually perpendicular faces that intersect with each other at edges forming three dihedral angles;
   wherein said working step results in a dihedral angle of more than one of the forming elements being unequal to 90°;
   wherein the dihedral angle is the angle of a corner element between mutually intersecting faces of the forming element;
   wherein a second surface opposite the first surface is not worked;
   wherein said working step is a controlled working step; and
   wherein the substrate is electroformed nickel.

17. A method of making a substrate for assembly into a production tool to make an array of aberrated optical elements, said method comprising the steps of:
   providing a substrate having a thickness of greater than 10.00 mm and a first surface with forming elements thereon, wherein the geometry of the forming elements corresponds to the geometry of non-aberrated optical elements in an analogous array;
   performing a working step by application of one of pressure, energy, chemicals, and the impingement of particles at a localized region on the first surface of the substrate, said working step is of a magnitude sufficient to aberrate forming elements in an affected site including and surrounding the localized region on the first surface;
   wherein said working step is performed so that the array has a total retroreflectance that is at least 90% of that of the analogous array;
   wherein the optical elements are retroreflective cube corner elements with three mutually perpendicular faces that intersect with each other at edges forming three dihedral angles;
   wherein said working step results in a dihedral angle of one or more of the forming elements being unequal to 90°;
   wherein the dihedral angle is the angle of a corner element between mutually intersecting faces of the forming element;

wherein a second surface opposite the first surface is not worked;
wherein said working step is a controlled working step; and
wherein the substrate is electroformed nickel.

* * * * *